US011740094B2

(12) United States Patent
Salter et al.

(10) Patent No.: US 11,740,094 B2
(45) Date of Patent: Aug. 29, 2023

(54) PROVIDING TRIP STATUS IN A VEHICLE

(71) Applicant: Ford Global Technologies, LLC, Dearborn, MI (US)

(72) Inventors: Stuart C. Salter, White Lake, MI (US); Annette Lynn Huebner, White Lake, MI (US); Pietro Buttolo, Dearborn Heights, MI (US); Paul Kenneth Dellock, Northville, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 726 days.

(21) Appl. No.: 16/604,205

(22) PCT Filed: Apr. 19, 2017

(86) PCT No.: PCT/US2017/028360
§ 371 (c)(1),
(2) Date: Oct. 10, 2019

(87) PCT Pub. No.: WO2018/194585
PCT Pub. Date: Oct. 25, 2018

(65) Prior Publication Data
US 2020/0116503 A1    Apr. 16, 2020

(51) Int. Cl.
*B60Q 3/78*    (2017.01)
*B60Q 3/20*    (2017.01)
*B60Q 3/18*    (2017.01)
(Continued)

(52) U.S. Cl.
CPC ............. *G01C 21/343* (2013.01); *B60Q 3/18* (2017.02); *B60Q 3/20* (2017.02); *B60Q 3/78* (2017.02);
(Continued)

(58) Field of Classification Search
CPC ............... B61L 15/009; B61L 15/0072; B61L 2205/04; B61L 15/0045; B61L 25/025;
(Continued)

(56) References Cited

U.S. PATENT DOCUMENTS 3,953,720 A    4/1976 Kelch
6,748,319 B2    6/2004 Aoki
(Continued)

FOREIGN PATENT DOCUMENTS

CN    102509361 A    6/2012
DE    102012111214 A1    5/2014
(Continued)

OTHER PUBLICATIONS

Notification of Transmittal of International Search Report and Written Opinion of the International Searching Authority dated Jul. 6, 2017 regarding International Application No. PCT/US2017/028360 (13 pages).

*Primary Examiner* — Geepy Pe
*Assistant Examiner* — Paulo Roberto Gonzalez Leite
(74) *Attorney, Agent, or Firm* — Brandon Hicks; Bejin Bieneman PLC (57) ABSTRACT

A computer having a processor and memory storing instructions executable by the processor. The computer is programmed to: determine a total trip parameter associated with a destination of an occupant of a vehicle; determine a progress parameter since an outset of an occupant trip; and control a light output of a status assembly, wherein the output represents the parameters.

17 Claims, 5 Drawing Sheets

(51) Int. Cl.
  *G06Q 10/02* (2012.01)
  *G06Q 50/30* (2012.01)
  *G06V 20/59* (2022.01)
  *G01C 21/34* (2006.01)
  *G08G 1/133* (2006.01)
(52) U.S. Cl.
  CPC ......... *G01C 21/3438* (2013.01); *G06Q 10/02* (2013.01); *G06Q 50/30* (2013.01); *G06V 20/593* (2022.01); *G08G 1/133* (2013.01)
(58) Field of Classification Search
  CPC ... B60Q 3/18; B60Q 3/20; B60Q 3/78; B60Q 3/14; B60Q 3/80; B60Q 9/00; G01C 21/343; G01C 21/3438; G01C 21/3697; G08G 1/133; G08G 1/20; G06V 20/593
  See application file for complete search history.

(56) References Cited

U.S. PATENT DOCUMENTS

| | | | |
|---|---|---|---|
| 7,280,913 | B2 | 10/2007 | Ruschkowski |
| 8,818,726 | B1 | 8/2014 | Jones |
| 9,442,888 | B2 | 9/2016 | Stanfield et al. |
| 2008/0004803 | A1* | 1/2008 | Kikuchi ............... G08G 1/0969 701/533 |
| 2016/0349067 | A1 | 12/2016 | Fowe |
| 2019/0344707 | A1* | 11/2019 | Nelson .................. B60Q 3/233 |

FOREIGN PATENT DOCUMENTS

| | | |
|---|---|---|
| EP | 2674931 A1 | 12/2013 |
| JP | 2007133553 A | 5/2007 |

\* cited by examiner

| Time | LED1 | LED2 | LED3 | LED4 | LED5 | LED6 | LED7 |
|---|---|---|---|---|---|---|---|
| 0 | 11 | 3 | 2 | 1 | 0 | 0 | 0 |
| 100 ms | 15 | 11 | 3 | 2 | 1 | 0 | 0 |
| 200 ms | 15 | 15 | 11 | 3 | 2 | 1 | 0 |
| 300 ms | 15 | 15 | 15 | 11 | 3 | 2 | 1 |

PROVIDING TRIP STATUS IN A VEHICLE

BACKGROUND

When a passenger enters a taxicab and provides a destination, the passenger may not know how long the trip will take—e.g., particularly in regions experiencing heavy traffic congestion—e.g., where alternate routes may be used and/or the duration of a delay may be difficult to estimate. In addition, if the taxicab is first dropping off another passenger at a different destination, the second passenger may not know how much additional time will be expended before the taxicab reaches second passenger's destination.

DETAILED DESCRIPTION

A trip status system is described that includes a computer and a status assembly. According to one illustrative example, the computer is programmed to: determine a total trip parameter associated with a destination of an occupant of a vehicle; determine a progress parameter since an outset of an occupant trip; and control a light output of a status assembly, wherein the output represents the parameters.

According to the at least one example set forth above, the parameters are a total trip time and a time since the outset or the parameters are a total trip distance and a distance since the outset.

According to the at least one example set forth above, the computer further may be programmed to re-determine the parameters and change the output based on the recalculation.

According to the at least one example set forth above, the computer further may be programmed to: identify in which of a plurality of vehicle seats the occupant is located; and, based on the identification, control a light color of at least a portion of the seat.

According to the at least one example set forth above, the light color corresponds with a color of the light output on the status assembly.

According to the at least one example set forth above, the computer further may be programmed to: determine a second occupant in the vehicle, determine a total trip parameter and a progress parameter associated with the second occupant, and control the light output based on both occupants, wherein the respective outputs represent the respective parameters.

According to the at least one example set forth above, the output differs in color based on whether the parameters are associated with the first occupant or the second occupant.

According to the at least one example set forth above, the output cycles between a first light output associated with the first occupant and a second light output associated with the second occupant.

According to the at least one example set forth above, a color of the first light output corresponds with a color of a vehicle seat within which the first occupant is located, wherein a color of the second light output corresponds with a color of a vehicle seat within which the second occupant is located, wherein the colors of the first and second outputs differ.

According to the at least one example set forth above, the output comprises a first light output associated with the first occupant and a second light output associated with the second occupant, wherein the first and second light outputs are presented concurrently.

According to the at least one example set forth above, the computer further is programmed to receive the destination from a mobile device.

According to the at least one example set forth above, the computer further may be programmed to generate the light output by controlling an illumination of a plurality of light sources linearly-arranged between a first end and a second end, wherein the controlled illumination is based on repeatedly updating the progress parameter, wherein a visual appearance of the controlled illumination appears as a light bar, wherein the computer further may be programed to execute a smoothing algorithm so that the controlled illumination from the plurality of light sources appears as a smoothly-extending bar.

According to the at least one example set forth above, the computer further may be programmed to, when executing the algorithm, control the intensity of a leading edge region that includes some of the plurality of light sources.

According to another illustrative example, a system may include the computer and status assembly described above, wherein the computer is coupled electrically to the status assembly, wherein the assembly may include a plurality of linearly-arranged light sources and a light guide.

According to the at least one example set forth above, the light guide includes a plurality of linearly-arranged protrusions, wherein each protrusion is positioned to receive light from a light source.

According to the at least one example set forth above, the light guide includes a base from which the plurality of linearly-arranged protrusions extends, wherein the base includes a surface through which the received light exits, wherein the light guide includes a mixing region between the surface and the plurality of linearly-arranged protrusions, wherein the mixing region is sized to permit light which is received via adjacently-located protrusions to mix.

According to the at least one example set forth above, wherein the mixing region is less than a predetermined threshold, wherein the threshold is defined by a ratio of a first distance (m) to a second distance (L), wherein length (L) is defined as a distance between the surface and a distal end of the respective protrusions, wherein length (m) is defined as a distance between the surface and a proximate end of the respective protrusions, wherein the proximate ends are adjacent the base.

According to the at least one example set forth above, wherein the threshold (m/L) is less than 0.5.

According to the at least one example, the computer is programmed to execute any combination of the examples set forth above.

According to another illustrative example, a method may include: determining a total trip parameter associated with a destination of an occupant of a vehicle; determining a progress parameter since an outset of an occupant trip; and controlling a light output of a status assembly, wherein the output represents the parameters.

According to the at least one example set forth above, the method also may include: based on controlling the light output, actuating a luminous element in a vehicle seat in which the occupant is located causing the element to emit a color in the visible spectrum, wherein the controlled light output is the same color.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

Further, according to the at least one example, a computer program product is disclosed that includes a computer readable medium that stores instructions executable by a computer processor, wherein the instructions include any combination of the examples of the method(s) set forth above.

Figure 1:
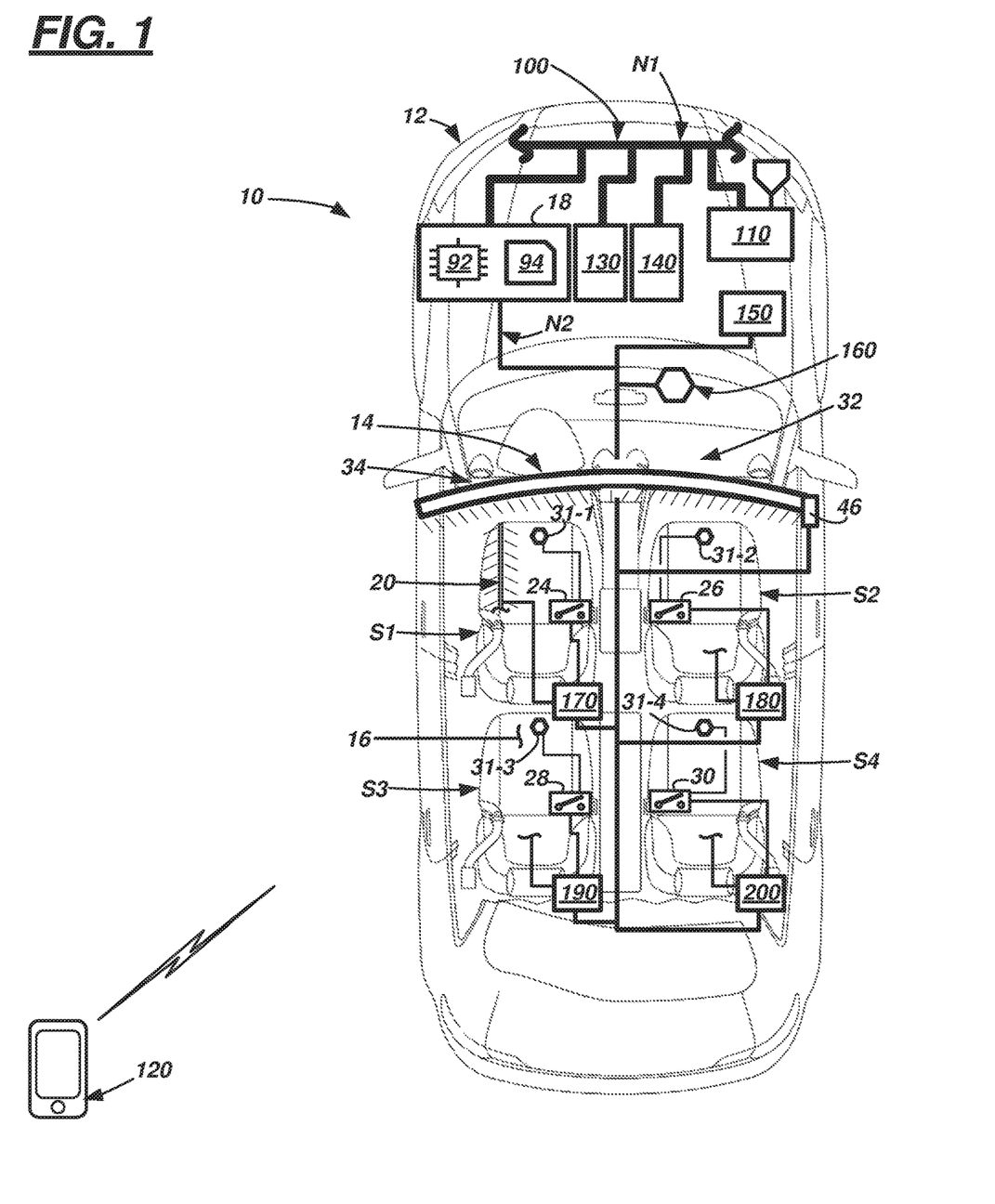
FIG. 1 is a schematic view of a trip status system that includes a computer and a status assembly located within a cabin of a vehicle.

Now turning to the figures, wherein like numerals indicate like parts throughout the several views, there is shown a trip status system 10 for a vehicle 12 that includes a status assembly 14 (within a cabin 16 of the vehicle 12) and a computer 18 that controls the status assembly 14. As described below, in at least one example, vehicle 12 may be a fully autonomous passenger vehicle such as an autonomous taxi, autonomous bus, etc. For example, using system 10, an occupant may provide the computer 18 with a desired destination for his/her trip and while traveling within the vehicle 12, the status assembly 14 can provide a visual indication of the occupant's progress—e.g., the indication providing a current trip progress relative to an entire trip time (or an entire trip distance) to the destination. The computer 18 further may determine a vehicle seat (e.g., one of S1-S4) in which the occupant may be seated and in response to this determination, actuate a luminous element 20 of the respective seat that causes at least a portion of the seat (e.g., S1) to emit or reflect light of a predetermined visible wavelength. The perceived color of the respective seat may correspond with a visible wavelength (and perceived color) emitted at the status assembly 14 so that the occupant in seat S1 may associate status assembly information with his/her trip and destination. Where multiple occupants are transported—each having a different destination, the status assembly 14 may provide trip data (e.g., progress information) associated with each occupant. And the intuitive nature of the color-matching scheme may improve the users' travel experience.

Referring to FIG. 1, the vehicle 12 is shown as a passenger car; however, vehicle 12 could also be a truck, sports utility vehicle (SUV), recreational vehicle, bus, train, marine vessel, aircraft, or the like that includes the trip status system 10. Vehicle 12 may be operated in any one of a number of autonomous modes. In at least one example, as discussed above, vehicle 12 may operate as an autonomous taxi, autonomous bus, or the like; however, this is not required. In at least one example, vehicle 12 is operable in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

Vehicle 12 may have any quantity of seats. Four (S1-S4) are shown in FIG. 1 only as an illustrative example; other quantities are possible. Further, the arrangement of seats S1-S4 may be in any suitable positions and/or orientations—e.g., including facing one another or the like. Each seat S1-S4 may have an occupant-actuatable switch (24, 26, 28, 30, respectively) that enables an occupant to provide input to the trip status system 10. Each of the switches may be similar or identical; thus, only one is explained herein. And as explained more below, in a first position, the switch 24 may be OFF, and when actuated to a second position, the switch 24 may provide an electrical indication to computer 18 that the occupant of the respective seat S1-S4 desires to see his/her trip progress information on the status assembly 14.

In addition, each seat S1-S4 may have a seat occupancy sensor 31-1, 31-2, 31-3, 31-4, respectively. Occupancy sensors 31-1 through 31-4 may provide an indication of whether an individual is located the associated seat. Such occupancy sensors include pressure sensors, proximity sensors, and the like. These and other such devices are known in the art and will not be described in greater detail here.

Each seat S1-S4 also may have one or more luminous elements 20 which are actuatable by computer 18. According to one non-limiting example, the luminous element(s) 20 include one or more light pipes sewn or attached to the seats S1-S4—e.g., in a cord or so-called piping of the seat (S1-S4). FIG. 1 shows a portion of the piping illuminated to illustrate an example. In this example, the light pipe may be coupled to a light engine (not shown), and the light engine, as known in the art, may include a printed circuit board having a control circuit and a light emitting diode (LED) arranged to emit light through the light pipe.

According to another non-limiting example of luminous element(s) 20, the luminous element 20 may include a light source which radiates light on or toward one or more of seats S1-S4, wherein the light has at least one predetermined wavelength (e.g., in the ultraviolet light band). In this example, the fabric of the seat, piping of the seat, etc. may include a paint, dye, or other luminescent material known to emit light within the visible spectrum (e.g., as used herein, between 390 and 700 nanometers) when exposed to the predetermined wavelength. Thus, when the light from the luminous element 20 radiates light onto the fabric or piping, the paint, dye, or luminescent material may react to the light and emit a predetermined color in the visible spectrum. As explained below, this color may correspond to a perceived color on the status assembly 14 (e.g., according to the one or more wavelengths emitted therefrom).

According to at least one example, the status assembly 14 may be any suitable illumination device which is controlled by computer 18 to emit light, wherein the emitted light comprises non-alpha-numeric data that represents both a total trip parameter and a progress parameter. The total trip parameter may be a total trip time (e.g., expected total travel time, as determined by computer 18) or a total trip distance (e.g., expected total travel distance, as determined by computer 18). And the progress parameter may be a percentage of the total trip time or an elapsed portion of the total trip time since an outset of an associated trip (e.g., as determined by computer 18) or a percentage of the total trip distance or a traversed (or driven) portion of the total trip distance since an outset of the associated trip (e.g., as determined by computer 18). In at least one example, the progress parameter instead could include a time or distance remaining as well (e.g., counting down or total time/distance less the time/distance since the outset). As will be explained below, the total trip and progress parameters may be calculated by computer 18 or may be reported thereto (e.g., sometimes in response to a query by computer 18 to a navigation unit 130 onboard vehicle 12, as described below).

In at least one example, the status assembly 14 may be located in the cabin 16 above a vehicle instrument panel 32—e.g., mounted to and/or suspended from a vehicle headliner 34 (e.g., in a horizontal orientation); however, other locations and orientations are possible. The status assembly 14 may face one or more vehicle seats S1-S4 in the cabin 16 so that occupants may view the illuminated trip data. Thus, in the illustrated example, status assembly 14 provides trip data in a vehicle-rearwardly direction as the four illustrated seats S1-S4 face vehicle-forwardly. Of course, this is merely one example; the status assembly 14 could be mounted in other locations as well—e.g., including other places one the vehicle headliner 34. In one example, the status assembly 14 may be centrally-located between seats S1-S2 and seats S3-S4, wherein seats S1-S2 face vehicle-rearwardly (and face the illustrated seats S3-S4, which face vehicle-forwardly); in such an implementation, the status assembly 14 may emit light from two sides (e.g., emitting light vehicle-forwardly and vehicle-rearwardly). Still other examples exist.

Figure 2:
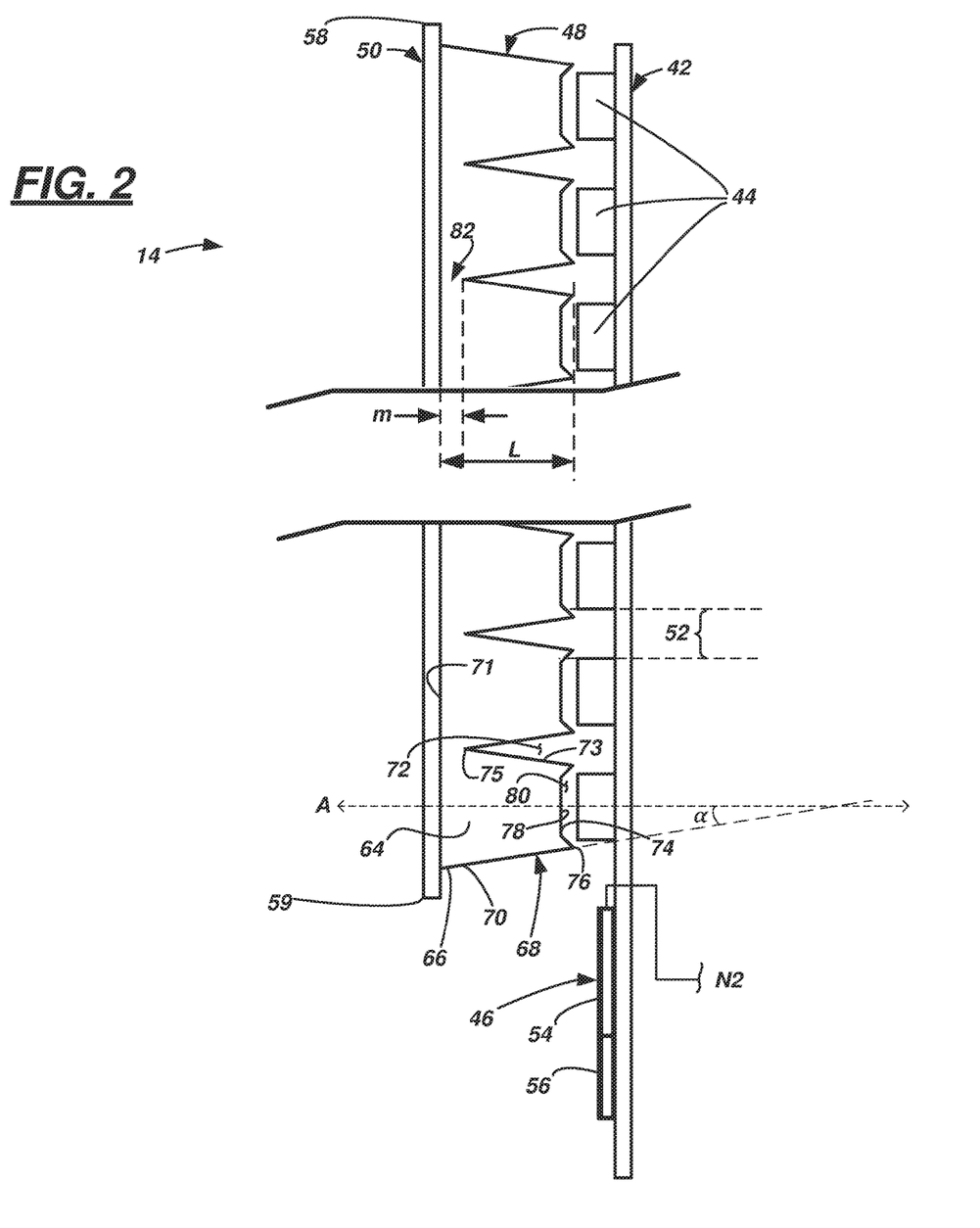
FIG. 2 is a sectional diagram of one example of the status assembly.
Figure 3:
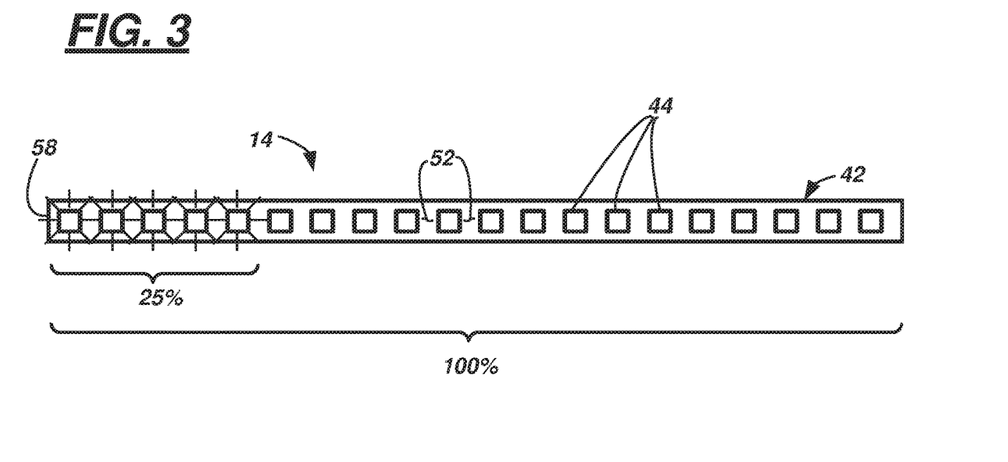
FIG. 3 is another schematic diagram of the exemplary status assembly.

FIG. 2 illustrates a sectional view of one example of status assembly 14. In the illustrated example, status assembly 14 includes a printed circuit board (PCB) 42 carrying multiple light sources 44 coupled to a light engine controller 46, an optic or light guide 48 for receiving and redirecting light from the sources 44, and a diffuser 50 for spreading and/or scattering light which passes through the light guide 48. The light sources 44 may be linearly-arranged; e.g., in a row forming a curve and/or straight line on the PCB 42—e.g., as schematically shown in FIG. 3 (where only twenty (20) light sources 44 are shown for illustrative purposes; however, it should be appreciated that in other examples (and as explained below), more light sources 44 more or fewer light sources 44 could be used). In at least one example (e.g., to minimize build-costs), the light sources 44 are light emitting diodes (LEDs), and the adjacently-located LEDs (in the given row) are equally spaced from one another by a gap 52 (e.g., gap 52 could be ¼ inch). The total span of the LEDs 44 on the PCB 42 may approximate a width of the vehicle cabin 16. In some examples, it could be two-and-one-half (2.5) to four (4.0) feet in length; thus, for example, if the status assembly 14 were three (3) feet in length, it could have a row of one hundred and forty-four (144) light sources 44 (e.g., wherein adjacent LEDs are spaced ¼ inch apart); this of course, is only one example, and other examples also exist.

Controller 46 (shown in FIG. 2) selectively may control the wavelength and intensity of light emitted by light sources 44. For example, light sources 44 may be commercially-available RGB LEDs—i.e., each LED 44 may emit different quantities of red, green, and blue light to combine to form potentially thousands of different hues of light in the visible spectrum. As described below, when the status assembly 14 emits light that is associated with the total trip and progress parameters of a first occupant, each of the illuminated LEDs 44 may emit a first color. Referring again to FIG. 3 as an example, the total trip parameter may be associated with all illuminated and un-illuminated LEDs 44 in a status assembly row (e.g., twenty (20) LEDs in this example); and the progress parameter may be associated with only the illuminated LEDs 44 in the row (e.g., five LEDs in FIG. 3). Thus, the trip data for the first occupant may be presented as a ratio of the progress parameter to the total trip parameter. Thus, in this example, FIG. 3 illustrates that vehicle 12 has traveled 25% of the time (or distance) to the associated occupant's destination.

As discussed above, the status assembly 14 may provide trip data for multiple occupants. Thus, when presenting trip and progress parameters associated with a second occupant, each of the illuminated LEDs 44 may emit a second wavelength (color) that is different from the first color (e.g., similarly, different wavelengths (colors) may be used for a third, fourth, fifth, etc. occupant). Again, as discussed above, progress information may be provided to the second occupant according to a ratio of illuminated LEDs 44 versus the total quantity of illuminated and un-illuminated LEDs 44.

In addition, for each presentation of trip and progress parameters (e.g., per occupant), controller 46 selectively may control an intensity of the illuminated LEDs 44 to generate an appearance of a smoothly extending light bar. The light bar is comprised of the light output of a row of at least partially illuminated LEDs 44; it may appear to be a bar graph that smoothly extends between the ends of the status assembly 14—e.g., again, wherein the length of the illuminated and un-illuminated LEDs 44 may correspond to the total trip parameter and the illuminated, smoothly extending light bar may correspond to the progress parameter. The smoothness of the extending light bar can be based on an illuminated smoothing algorithm executed by the controller 46 as well as the shape of the light guide 48. Each will be discussed in turn.

The controller 46 may comprise a processor 54 coupled to memory 56 which stores instructions executable by the processor 54. Processor 54 can be any type of device capable of processing electronic instructions, non-limiting examples including a microprocessor, a microcontroller or controller, an application specific integrated circuit (ASIC), etc.—just to name a few. In general, controller 46 may be programmed to execute digitally-stored instructions, which may be stored in memory 56 which enable the controller 46, among other things, to control the light sources 44 in response to instructions from computer 18, selectively control the wavelength emitted by the light sources 44, selectively control the intensity of light emitted by the light sources 44, and execute the illumination smoothing algorithm (e.g., by controlling light source intensities).

Memory 56 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. As discussed above, memory 56 may store one or more computer program products which may be embodied as software, firmware, or the like.

Figure 4:
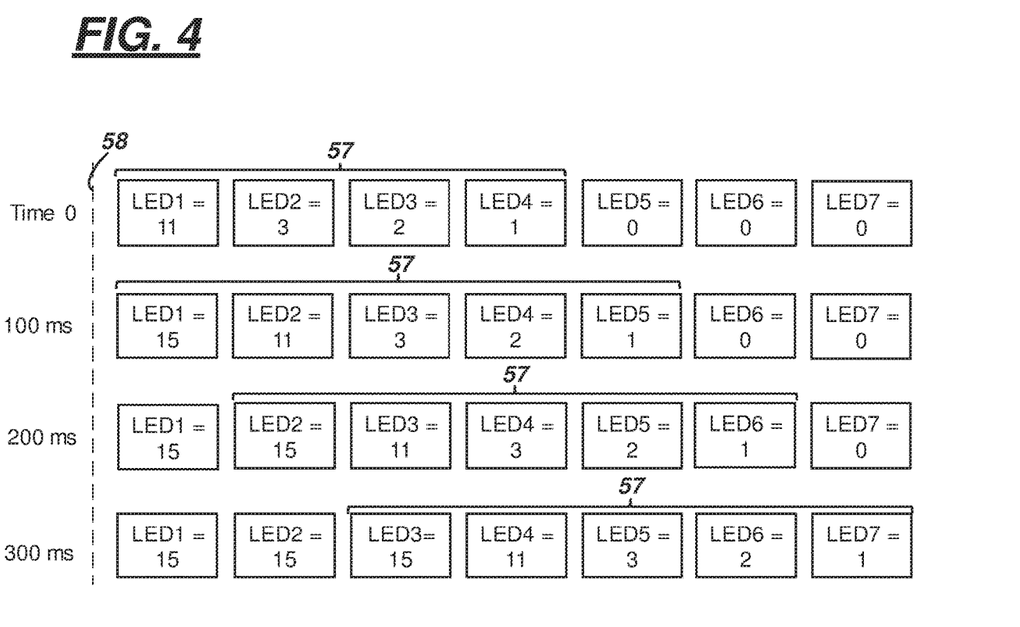
FIG. 4 is a schematic diagram depicting an illumination smoothing algorithm executed by the computer of the trip status system.

FIG. 4 illustrates an example of how the controller 46 may control the intensity of the LEDs 44 during execution of the smoothing algorithm. As described above, the wavelength(s) emitted by the respective LEDs 44 may remain constant; thus, in at least one example, a smoothing effect of the extending light bar may be achieved by varying the intensities of a leading edge region 57 of the extending light bar. For the purpose of illustrating an intensity pattern, FIG. 4 illustrates the intensity states of the first seven LEDs 44 at one end 58 of the status assembly 14 at several different instantaneous times (t)—e.g., when time (t) is 0 milliseconds (ms), 100 ms, 200 ms, and 300 ms. In this example, a predetermined time interval of 100 ms is used; however, other predetermined interval values may be used instead. It should be appreciated that in the pattern described below, the intensity of each LED 44 can vary linearly between 0 and 15, wherein '0' is LED OFF and '15' is a LED at full brightness 44. Thus, in this example, each LED 44 has an intensity resolution that includes sixteen (e.g., 2^4) possible intensity states. Of course, other resolutions could be used instead. Returning to the example shown in FIG. 4, at time t=0 ms, the first four LEDs (e.g., 1, 2, 3, and 4) comprise the leading edge region 57 and are illuminated at brightnesses that correspond to intensities 11, 3, 2, 1, respectively, while the state of LEDs 5-7 is OFF (0). At the next interval (t=100 ms), LEDs 1, 2, 3, 4, and 5 comprise the leading edge region 57 and are illuminated at brightnesses that correspond to intensities 15, 11, 3, 2, 1, respectively, while LEDs 6-7 are OFF (0). At the next interval (t=200 ms), LEDs 1, 2, 3, 4, 5, and 6 are illuminated at brightnesses that correspond to intensities 15, 15, 11, 3, 2, 1, respectively, while LED 7 is OFF (0). Here, the leading edge region 57 comprises LEDs 2-6-e.g., as the region 57 has shifted toward an opposite end of the status assembly 14. And at the next interval (t=300 ms), LEDs 1, 2, 3, 4, 5, 6, and 7 are illuminated at brightnesses that correspond to intensities 15, 15, 15, 11, 3, 2, 1, respectively (and LED 8, if shown, would be OFF (0)). Here again, the leading edge region 57 has shifted and now comprises LEDs 3-7. Of course, were the pattern to be repeated, the region 57 could continue to shift in the same direction giving the appearance of a smoothly-extending light bar.

In at least one example, the larger the progress parameter, the longer the light bar extends from end 58. Where an occupant's destination is relatively nearby (e.g., a few city blocks away), the light bar may extend relatively quickly between the first and second ends 58, 59 of the status assembly 14, and this smoothly extending light bar may be more aesthetically pleasing to the occupant.

When multiple occupants are present in vehicle 12, a light bar of a first color may extend according to the smoothing algorithm—e.g., for the first occupant, then all the LEDs 44 may turn OFF (intensity 0). Thereafter, the process described above may be repeated for additional occupants, cycling through an illumination of respective light bars associated with the additional occupants—e.g., except that a different color may be used for each occupant. And of course, the respective total trip and progress parameters associated with these other occupants may result in light bars of different lengths. The duration of each light bar illumination cycle may vary; regardless, it may be suitably long enough for each occupant to identify that the light bar pertains to them (e.g., by color) and also perceive approximately how much time or distance remains in their respective trip. Further, computer 18 may cause the light output to be presented long enough for the occupants to observe the light bar extending (e.g., according to the shifting of the leading edge region 57, described above). This again is merely one example of a smoothing algorithm which may be executed by controller 46; other examples are also possible.

As discussed above, the shape of the light guide 48 also may contribute to the smoothing effect of the extending light bar. Returning to FIG. 2, the light guide 48 may include a body 64 formed in a single unitary piece of material (e.g., in a mold and/or cut from a molded piece); non-limiting examples of material include acrylic, polycarbonate, etc. The body 64 may have a base 66 and multiple protrusions 68 extending from one side 70 of the base 66. Each protrusion 68 may be identical; therefore, only one will be described.

In at least one example, a surface 71, on an opposite side of the base 66, may define a contour of the status assembly 14 (e.g. FIG. 1 shows a curved contour; however, other examples exist (e.g., planar, angular, etc.)). The protrusions 68 may be linearly-arranged and may be spaced to correspond with the spaced light sources 44 mounted on the PCB 42 (e.g., when assembled, the body 64 of the light guide 48 may contact the PCB 42 and/or light sources 44, or may be spaced therefrom as shown in FIG. 2). Each protrusion 68 may be conical, pyramidal, dome-shaped, or the like. Thus, a void 72 may exist between adjacent protrusions 68, and the void 72 may extend between a distal end 76 of the protrusion 68 and an end 75 proximate (or adjacent) the base 66. In the illustrated example, the voids 72 are angular (e.g., defined by an outer surface 73 of the respective protrusions 68); however, they may be curved in other examples. Surface 73 may have an angular slope α relative to a central axis A of a respective protrusion 68 (e.g., the axis A being central to a corresponding light source 44 as well). Slope α may be within a suitable range of angles in order to promote total internal reflectance (TIR) of the light rays within the protrusion 68. Further, each protrusion 68 may have a cavity 74 at the distal end 76 (e.g., along the central axis A). In FIG. 2, a surface 78 of cavity 74 defines a frustoconically-shaped volume 80; however, this is merely an example. For example, the cavities 74 may have any suitable shape. When assembled, the distal end 76 of the protrusion 68 may be suitably close enough to the corresponding light source 44 such that emitted light from the source 44 predominantly enters the light guide 48 via surface 78 and exits the light guide 48 at surface 71—e.g., in this manner, light from source 44 may be inhibited from escaping into an adjacent void 72 or into the cavity 74 of an adjacently-located protrusion 68. In this manner, light distribution is further controlled to achieve a desired smoothing effect according to the characteristics of the light guide 48.

In at least one example, light guide 48 also may include a mixing region 82; e.g., the mixing region 82 can be a region of the body 64 where light received through one protrusion 68 is permitted to mix with light received through a different protrusion 68 (e.g., via an adjacent protrusion). As explained below, the size of the mixing region 82 may affect the smoothing effect of the light output. According to one example, the size of the mixing region 82 is defined by a ratio of a distance m and a distance L, wherein m/L is less than a predetermined threshold. Length (L) may be a distance between the surface 71 and distal end 76 of protrusions 68. And length (m) may be a distance between the surface 71 and end 75 of protrusions 68. In at least one example, the predetermined threshold is 0.5 (e.g., of course, other ratios can be used in other examples). According to one example, the smoothing effect of the extending light bar may be achieved by executing the smoothing algorithm at controller 46 with a light guide 48 having the above-described mixing region 82.

Figure 5:
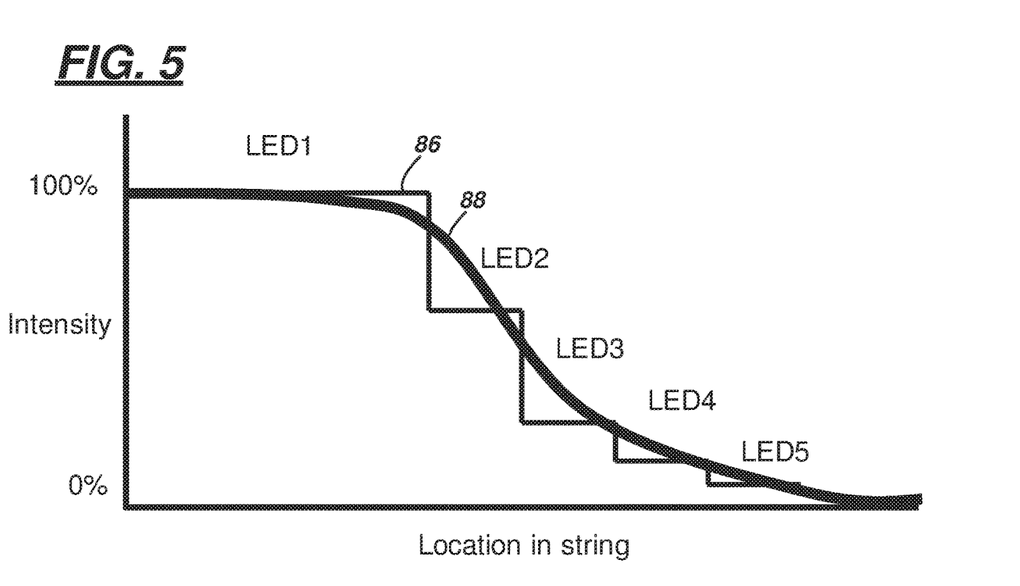
FIG. 5 is a graphical depiction illustrating a smoothing effect of a status assembly diffuser.

Diffuser 50 may be located adjacent or proximate to surface 71. Diffuser 50 may be comprised of any suitable plastic. In at least one example, the diffuser is opaque (e.g., milky white or the like). FIG. 5 illustrates two light intensity curves 86, 88—the stepped curve 86 representing an instantaneous light intensity of the first five LEDs 44 of the status assembly 14 without diffuser 50 and the calculated curve 88 representing light intensity of the same LEDs in which light received through light guide 48 also passes through diffuser 50. The smoother, continuous curve 88 illustrates an additional smoothing contribution of diffuser 50.

Figure 6:
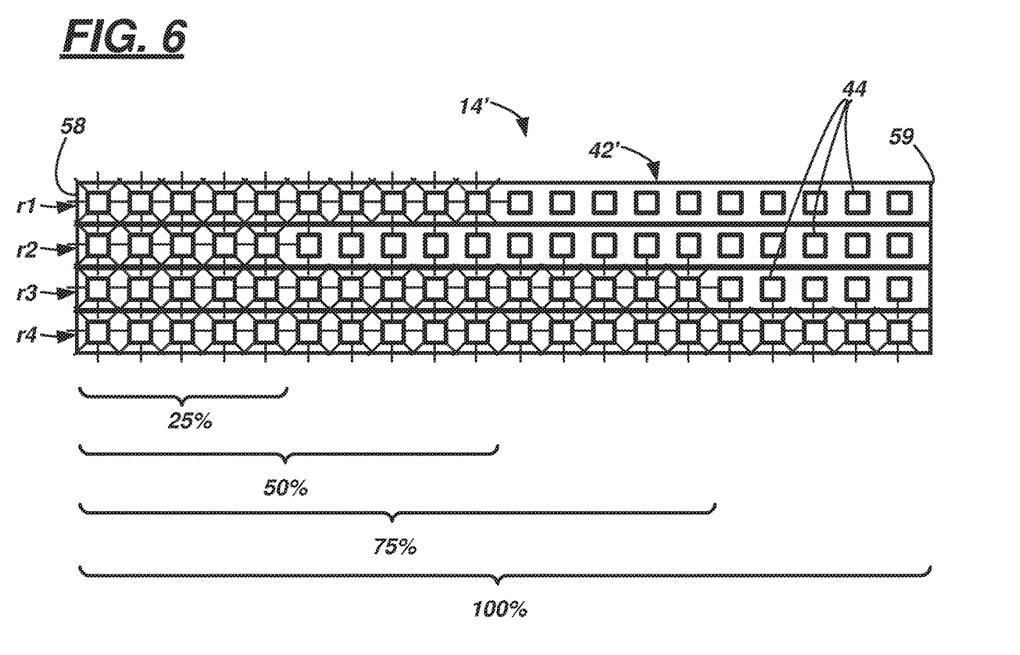
FIG. 6 is another example of the status assembly shown in FIG. 3.

FIG. 6 illustrates another example of status assembly 14. In FIG. 6, status assembly 14' includes multiple rows r1, r2, r3, r4 of light sources 44 on one or more PCBs 42' (e.g., four rows are shown for exemplary purposes only). More or fewer rows are also possible. In this example, the status assembly 14' can provide progress information to multiple occupants concurrently (e.g., in some instances, without cycling through trip data, as explained above). For example, in vehicle 12 (having four seats), the trip data of each occupant seated in respective seats S1-S4 may be provided on one of the corresponding rows r1-r4 of status assembly 14'. Again, each of these illustrative rows r1-r4 show only twenty light sources 44 extending from one end 58 of the assembly 14'; more or fewer sources 44 may exist in other examples.

Turning now to the computer 18 shown in FIG. 1, computer 18 may be a single computer (or multiple computing devices—e.g., shared with other vehicle systems and/or subsystems). In at least one example, computer 18 is a body control module (BCM); however, this is merely an example. Computer 18 may comprise a processor or processing circuit 92 coupled to memory 94. For example, processor 92 can be any type of device capable of processing electronic instructions, non-limiting examples including a microprocessor, a microcontroller or controller, an application specific integrated circuit (ASIC), etc.—just to name a few. In general, computer 18 may be programmed to execute digitally-stored instructions, which may be stored in memory 94, which enable the computer 18, among other things, to perform one or more of the following functions: to receive a message from a mobile device; determine a location of a mobile device within the vehicle cabin 16; based on the determined location of the mobile device, determine (e.g., by inference) that an occupant is located in a particular seat (S1-S4); receive a destination of the occupant (e.g., via a mobile device, via a human-machine interface (HMI) in the vehicle 12, etc.); determine at least one total trip parameter; determine at least one progress parameter; control and/or actuate controller 46 of the status assembly 14; in some examples, selectively control a light output (e.g., wavelength(s), intensity, etc.) of the light sources 44 of the status assembly 14; in some examples, control a smoothness of the light output extending on status assembly 14; control the luminous elements 20 of seats S1-S4; provide an additional indication that the vehicle 12 is approaching an occupant's destination; and perform a number of other functions related to the status assembly 14 and an occupant's trip, as described more below.

Memory 94 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 94 may store one or more computer program products which may be embodied as software, firmware, or the like.

As also shown in FIG. 1, trip status system 10 may have additional components as well, including but not limited to a vehicle network connection 100, a wireless communication module 110 for communicating with a mobile device 120, a navigation unit 130 for determining total trip time and/or distance, as well as trip progress, an interactive human-machine interface (HMI) 140 for vehicle occupants, an audio module 150 for alerting occupants when the vehicle 12 is approaching their desired destinations, a sensor 160 for providing data to computer 18 regarding ambient lighting, and a number of seat modules 170, 180, 190, 200 which, among other things, control the luminous elements 20 of seats S1-S4. Each will be discussed in turn.

Vehicle network connection 100 may include any suitable wired or wireless intra-vehicle communication network enabling communication between electronic devices such as computer 18, wireless communication module 110, navigation unit 130, HMI 140, audio module 150, sensor 160, and/or modules 170-200. In at least one example, computer 18, communication module 110, navigation unit 130, and HMI 140 are communicatively connected via a first network connection N1 (e.g., a controller area network (CAN) bus, Ethernet, fiber optic connection, or the like), and computer 18, audio module 150, sensor 160, seat modules 170-200, and light engine controller 46 are communicatively connected via a second network connection N2 (e.g., that includes a Local Interconnect Network (LIN) or the like). Of course, these are merely examples; and other network connection examples may exist—e.g., including the use of one or more discrete wired or wireless connections.

Wireless communication module 110 may be any suitable telematics computing device configured to wirelessly communicate with other electronic devices, including mobile device 120. Such wireless communication may include use of cellular technology (e.g., LTE, GSM, CDMA, and/or other cellular communication protocols), short range wireless communication (SRWC) technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-tovehicle (V2V) and vehicle-to-infrastructure (V2I) communications as well—all of which will be appreciated by those skilled in the art. For example, module 110 may include an embedded cellular chipset, an embedded SRWC chipset, or the like; further module 110 may facilitate cellular and/or SRWC communication using the chipset of a mobile device (not shown) carried by a user of vehicle 12 (e.g., a cellular phone, Smart phone, etc.). Module 110 may be programmed to receive a message including reservation data from mobile device 120 and deliver it to computer 18 via the connection 100. In at least one example, computer 18 shares physical components or logic with module 110—e.g., in one example, module 110 may be part of computer 18.

Mobile device 120 may be any portable electronic device having two-way communication capability. In at least one example, device 120 is a Smart phone having application software thereon enabling a user to send reservation data to vehicle 12—e.g., requesting a ride to a predetermined destination. The reservation message may include one or more of a pick-up location, the desired destination, time and date information, fare or fee information, and even a seat selection. In response to selecting a vehicle seat (e.g., S1), the mobile device 120 may display a colored vehicle seat graphic, wherein the graphic is a color that corresponds to an actual color of the seat S1 when the user becomes an occupant of the vehicle 12. This same color also may correspond to the light output (on assembly 14) associated with the occupant during the occupant's trip. Other non-limiting examples of mobile device 120 include a cellular telephone, a personal digital assistant (PDA), a laptop or tablet computer, a netbook computer, and the like.

Navigation unit 130 includes any suitable electronic device used to determine position data and/or heading data of the vehicle 12. Non-limiting examples of unit 130 include a Global Positioning System (GPS) unit and a Global Navigation Satellite System (GLONASS) device. As described below, navigation data may be used to: determine one or more routes to an occupant's desired destination; determine traffic conditions (e.g., traffic congestion, accidents, closed-roadways, etc.); determine a distance from an outset of an occupant's trip to his/her destination; and/or determine a travel time from the outset of the occupant's trip to his/her destination. In at least one example, computer 18 shares physical components or logic with module 130—e.g., in one example, module 130 may be part of computer 18. Further, reservation data and navigation data may be received by computer 18 and the determinations set forth above (e.g., based in part on the reservation data) may be carried out there instead.

Human-machine interface (HMI) 140 may include any suitable input and/or output devices such as switches, knobs, controls, etc.—e.g., on an instrument panel, steering wheel, etc. of vehicle 12—which are coupled communicatively to computer 18 via network 100. In one non-limiting example, HMI 140 may comprise an interactive touch screen or display which permits an occupant to select a destination for the vehicle 12 to travel and/or select a seat S1-S4 in which the occupant desires to sit. As will be apparent from the description below, an occupant need not carry a mobile device 120 to carry out the process described below.

Audio module 150 may be any electronic device that can be triggered by computer 18 to emit an audible sound. As described below, as vehicle 12 approaches an occupant's destination, the computer 18 may actuate status assembly 14 and module 150 to alert the occupant that the vehicle 12 will soon be stopping at his/her destination.

Sensor 160 may be any sensor that measures ambient light intensity and provides an output to computer 18. For example, the output of sensor 160 may toggle based on a detection of a first or lighted condition (e.g., direct sunlight, diffused sunlight, bright artificial lighting, etc.) and a second or low-light condition (e.g., dusk, evening, darkness, etc.). According to one example, computer 18 may control a relative gain of the intensity of light sources 44 based upon data received from sensor 160. For example, when the sensor 160 indicates the first condition, computer 18 may operate the LEDs 44 as described in the algorithm above; however, when the sensor 160 data indicates the second condition, computer 18 may de-activate the status assembly 14 or may reduce the relative gain of all the selectively actuated LEDs 44 (e.g., instead of the maximum intensity being 15, it may be 10, and all the remaining intensities may be scaled and/or normalized accordingly).

Seat modules 170-200 may include any number of electronic devices associated with the seats S1-S4 (respectively). For example, modules 170-200 each may serve as an interface between the switches 24-30, respectively, and computer 18. Similarly, modules 170-200 each may serve as an interface between occupancy sensors 31-1, 31-2, 31-3, 31-4, respectively, and computer 18. In at least one example, modules 170-200 may be used to identify a location within the vehicle cabin 16 of an occupant using a wireless signal from the occupant's mobile device 120. For example, each module 170-200 may include a wireless transceiver (e.g., operable using a suitable short range wireless protocol—e.g., such as BLE). Thus, in at least one example, computer 18 may receive a BLE signal from each of modules 170-200, and the modules 170-200 may be located in different regions of the vehicle cabin 16 (e.g., known to computer 18). Based on relative signal strengths from mobile device 120 received at each of the modules 170-200, the locations of modules 170-200, and triangulation techniques, computer 18 may determine the location of device 120. Based on this determination, computer 18 may infer which seat S1-S4 the occupant sits—e.g., and in some examples, actuate the respective seat module causing the associated seat to illuminate. This technique could be used individually or in combination with other sensed information—e.g., including information from occupancy sensors 31-1, 31-2, 31-3, 31-4. In addition, using similar data collected by modules 170-200, computer 18 also may determine that an occupant has moved or changed seats during his/her trip—and as explained more below, if this is determined, the computer 18 may cease illuminating the previous seat (e.g., S1) and cause the new seat (e.g., S2) to illuminate instead. Further, in response to this determination, computer 18 may cause the status assembly 14 may provide a light output of a correspondingly different color too.

According to another example, any one or more of modules 170-200 may use other techniques to determine a location of mobile device 120 (and its owner/occupant). For example, at least one of the modules may utilize a SRWC protocol such as BLE and use one or more of a signal strength measurement technique, a time-of-flight technique, an angle-of-arrival technique, or the like to determine a location of an occupant within vehicle 12. Of course, in these mobile-device-locating examples, short range wireless communication protocols other than BLE also could be used.

Figure 7:
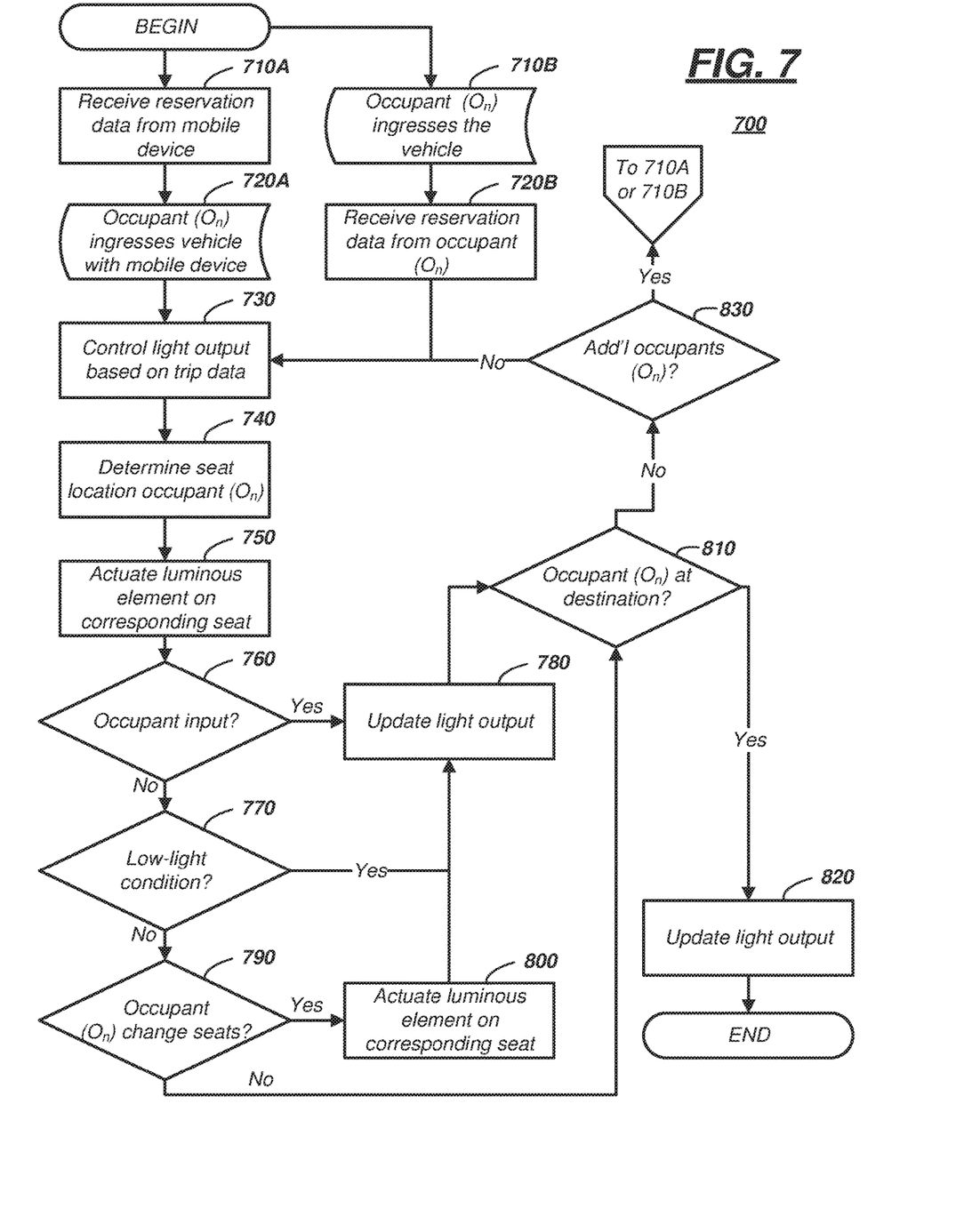
FIG. 7 is a flow diagram illustrating a process of using the trip status system to provide trip data to occupants of the vehicle shown in FIG. 1.

Turning now to FIG. 7, a flow diagram is shown that illustrates a process 700 of using the trip status system 10 to provide trip data to occupants of the vehicle 12. In the following example, vehicle 12 is a fully autonomous vehicle which provides a taxi service to passengers carried thereby. In such an example, there may be no driver or attendant to answer such questions as: Are we there yet? And how much longer until we're there? The intuitiveness of the trip status system 10 and its operation may provide occupants answers to such questions. Of course, a fully autonomous vehicle is not required in all examples. Further, the cabin 16 of vehicle 12 may be arranged to carry any suitable quantity (n) of occupants (e.g., with respect to the illustrated vehicle 12, the quantity n=4).

The process 700 begins with blocks 710A, 720A (or 710B, 720B). According to the first flow path, in block 710A, computer 18 receives reservation data from mobile device 120 via wireless communication module 110 and vehicle network connection 100. The reservation data can include one or more of a pick-up location of a user, the user's desired destination, time and date information of the pick-up, fare or fee information, and even a seat selection selected by the user. In this manner, vehicle 12 may autonomously drive to the pick-up location and permit the user to enter the vehicle 12.

In block 720A, the occupant which sent the reservation data via mobile device 120 ingresses vehicle 12 carrying mobile device 120 and sits down in his/her pre-selected seat (e.g., S1). In at least one example, device 120 may be programmed to communicate with the module 110 via a SRCW protocol such as BLE—e.g., mobile device 120 may operate in a discoverable mode when the occupant enters the vehicle 12. Thereafter, process 700 proceeds to block 730.

According to the alternative path (710B, 720B), the user may enter the vehicle 12 first, then provide reservation data. Blocks 710B, 720B may be suitable when the user does not have a mobile device 120, or chooses not to use device 120 to hail the autonomous taxi 12. In block 710B, the user ingresses vehicle 12—e.g., hailing or finding the vehicle 12 in any suitable manner. Upon entering, the occupant could sit in seat S1 as well.

In block 720B which follows, the occupant may provide at least some of the same reservation data to computer 18—e.g., via mobile device 120, via HMI 140, or the like. At the very least, the occupant may provide a destination, and computer 18 may store a user outset location (e.g., data corresponding to a location where the occupant ingressed vehicle 12). Thereafter, process 700 proceeds to block 730.

Block 730, which follows block 720A or 720B, includes computer 18 controlling a light output at the status assembly 14, wherein the light output (e.g., a light bar) is associated with the occupant that ingressed the vehicle in block 720A or 710B. Prior to providing the light output, computer 18 may make any number of determination, calculations, etc. associated with the occupant's outset location, the occupant's desired destination, as well as other circumstances, as illustrated below.

It should be appreciated that block 730 may occur any time after computer 18 receives a destination for the occupant and receives or determines the occupant's outset location (e.g., which may be based on a pick-up location (per the reservation data) or a location where the occupant actually ingressed vehicle 12—e.g., where no advance reservation data was received). Thus, in one example, route determination can begin before the occupant enters the vehicle 12 (e.g., following block 710A but before block 720A).

In block 730, computer 18 may determine one or more routes from the outset location to the destination location—e.g., including data associated with the total trip parameter (e.g., total trip distance, total trip time, etc.). This may include using navigation unit 130 to calculate associated trip distances, trip times, traffic congestion, accident conditions, etc.—e.g., associated with the one or more potential routes. Computer 18 also may use wireless communication module 110 to communicate with remotely-located data servers (not shown) via an internet connection to acquire traffic, weather, and other data that may affect total trip parameter. Further, this determination by computer 18 may account for other occupant destinations which may cause computer 18 to select a route other than the most direct route to the occupant's destination. For example, another occupant could be seated in vehicle 12 prior to blocks 710A, 710B. And vehicle 12 may be taxiing this other occupant to a different destination. Thus, computer 18 may account for one or more indirect routes to the instant occupant's destination—which include making a stop for the currently-transported occupant.

Accounting for any combination of these circumstances (in block 730), computer 18 may select a desirable route from among the one or more potential routes (for the occupant described in blocks 710A-720A or 710B-720B). On this basis, computer 18 may determine said occupant's total trip parameter.

Once the total trip parameter has been determined, the progress parameter may be determined. The progress parameter can be considered a percentage or ratio of the total trip parameter (e.g., 0%≤total trip parameter≤100%). For example, if the occupant has not yet been picked up, then the progress parameter may be 0% (as the trip has not yet begun, hence progress relative to the occupant is nil). Further, at the outset location, the progress parameter also may be 0% for similar reasons (e.g., if the parameter is based on distance). Alternatively, if the progress parameter is based on time and the vehicle 12 must wait at the outset location, the progress parameter could be greater than 0% (as trip time begins accruing). Regardless, once the occupant is being transported by vehicle 12 away from the outset location, the progress parameter may be a value greater than 0%. And once the occupant reaches his/her destination, the progress parameter may be 100%. Once the occupant begins his/her trip, computer 18 in block 730 may calculate the total trip and progress parameters and control the light output of the status assembly 14 based on the trip data.

At least one example of controlling the light output was described above—e.g., computer 18 may instruct light engine controller 46 to provide a light bar of a predetermined color that wherein a length of the light bar (e.g., the illuminated light sources 44) corresponds with the progress parameter and wherein a length of the illuminated and un-illuminated light sources 44 corresponds with the total trip parameter. In some examples, the light bar may extend smoothly—e.g., based on the characteristics of the light guide 48, diffuser 50, etc. and based on controller 46 and/or computer 18 executing the smoothing algorithm described above. In examples where the occupant sent reservation data via the mobile device 120, the color of the light bar may correspond with a graphic of a seat selected by the occupant on his/her mobile device 120.

In block 740, computer 18 may determine a seat location of the occupant. This may be determined based at least in part on the seat-selection communicated from the mobile device 120. Further, as described above, computer 18 may determine this in other ways as well—e.g., using seat occupancy sensors (e.g., such as 31-1), using signal reception at seat modules 170-200 and a triangulation technique, using one or more transceivers (in modules 170-200 or even wireless communication module 110) and time-of-flight techniques, angle-of-arrival techniques, etc., or any combination thereof.

Once the occupant seat location is determined in block 740, then computer 18 in block 750 may actuate the luminous element 20 in the appropriate seat (e.g., seat S1) to illuminate at least a portion of the respective seat (e.g., seat S1). As described above, this may include illuminating a light pipe in vehicle seating, radiating UV light on the fabric of the seat to cause a reflection in the visible spectrum, or the like.

Following block 750, computer 18 may determine whether any updated occupant input has been received (block 760). This may be received via the mobile device 120 (and module 110) and/or via the network connection 100. For example, via the mobile device 120, the occupant may elect a new destination. Or the occupant may provide an updated destination via HMI 140. Or occupant may actuate the switch 24 on seat S1 queuing the status assembly 14 indicating that he/she wishes to see an updated light bar on status assembly 14. If computer 18 determines that any of these examples occur, process 700 may proceed to block 780. Else, the process proceeds to block 770.

In block 770, computer 18 may determine whether data from sensor 160 indicates a low-light condition. If computer 18 determines the low-light condition, process 700 also may proceed to block 780. Else, block 790 may follow block 770.

In block 780, computer 18 may perform one or more suitable functions. For example, if the occupant changed his/her destination, then computer 18 may perform the same determination made in block 730—including providing an updated light output via status assembly 14. The light output associated with a new destination may treat the location of the vehicle 12 (at the time the computer 18 received the new destination data) as the new outset location—e.g., for purposes of determining a new progress parameter. Or the computer 18 may use the original outset location. Regardless of which outset location is used, computer 18 may cause the light bar to reflect the new total time and progress parameters (e.g., in the manner described above).

If the switch 24 was actuated in block 760, then in block 780, computer 18 may re-determine (e.g., update) the progress parameter and provide an updated light output (e.g., presenting an updated light bar). Or if the low-light condition was determined in block 770, then in block 780, computer 18 may either reduce the overall gain (e.g., intensity) of the illuminated light sources 44 (or even turn OFF all light sources 44).

In block 790 (which may follow block 770), computer 18 may determine whether the occupant has changed seats (e.g., from seat S1 to seat S2)—e.g., using one or more of the techniques described above. If computer 18 determines that the occupant changed seats, then process 700 proceeds to block 800. Else, the process proceeds to block 810.

In block 800, the computer executes instructions similar to those carried out in block 750—except that the luminous element 20 which is actuated by computer 18 pertains to the new seat (e.g., seat S2). Following block 800, the process proceeds to block 780. In this instance of block 780, computer 18 changes the color of light bar associated with the occupant to match the color of the luminous element 20 on the new seat (e.g., seat S2). Following block 780, process 700 may proceed to block 810, as discussed above.

In block 810, the computer 18 determines whether the occupant has reached his/her desired destination. For example, computer 18 may receive updated navigation data from unit 130 and compare this data to the location data associated with the occupant's desired destination. If in block 810, the computer 18 determines that the boccupant has reached his/her destination, then process 700 proceeds to block 820. Else, the process 700 proceeds to block 830.

In block 830, the computer 18 may determine whether an additional occupant is ingressing vehicle 12. If so, at least a portion of the process 700 may be repeated—e.g., and computer 18 may loop back and repeat blocks 710A or 710B, depending on whether the new occupant is submitting reservation data via a mobile device or not. With respect to providing two different light outputs for the two respective occupants, as described above, computer 18 may cause the controller 46 to cycle or sequence the light outputs using two different colors—which each correspond to an associated occupant seat. For example, computer 18 may cause controller 46 to illuminate a first smoothly-extending light bar for the first occupant for a predetermined interval and then illuminate a second smoothly-extending light bar for the second occupant according to a similar interval. Computer 18 may execute similar instructions regardless of the quantity (n) of occupants in vehicle 12.

If no new occupant is ingressing vehicle 12 (in block 830), then the process may loop back to block 730 and update the light output of the status assembly 14. For example, computer 18 may receive updated data from navigation unit 130 and re-determine the progress parameter. Then, computer 18 may cause the light bar to smoothly extend there-across according to the change in the progress parameter, as previously described.

In block 820 which may follow block 810, the computer 18 may update the light output as at least one occupant has left (or is leaving) vehicle cabin 16. For example, computer 18 may terminate actuation of the light bar associated with the egressing occupant. If multiple occupants are in vehicle 12, then computer 18 may omit the light bar associated with the egressing occupant—e.g., omit it from the cycling (or sequence). Following block 820, the process 700 may end.

Other examples of process 700 also exist. According to one non-limiting example, switches 24-30 may be or may include an occupant-initiated privacy mode. For example, according to the mode, in response to receiving an indication of the desired privacy mode, computer 18 may not execute instructions which would cause a light output associated with the particular occupant. This may be desirable when the occupant does not wish to share trip information with other passengers of vehicle 12.

According to another non-limiting example, when light bars are cycling through different sets of total trip and progress parameters (e.g., associated with multiple occupants), one or more of the light bars may be given a higher priority by computer 18. For example, when the vehicle 12 approaches the destination of a first occupant, the light bar associated with the first occupant may be illuminated more often (e.g., out of sequence) or for a longer interval. Or during the interval, the associated light bar may blink or have an increased intensity. Or during the interval, the audio module 150 may chime or emit any suitable audible sound. Or in another example, computer 18 may instruct module 110 to call or message the occupant's mobile device.

According to another non-limiting example, when the low-light condition is determined by computer 18 (e.g., block 770), the light sources 44 of the status assembly 14 may be dimmed or turned OFF within 1-2 minutes prior to reaching an occupant's destination. Still other examples are also possible.

Thus, there has been described a trip status system for a vehicle. The system includes a computer and a status assembly that can use discrete light sources to provide a visual indication of both a progress parameter and a total trip parameter. The parameters may be associated with time or distance; however, this is not required. The system can provide these parameters to multiple occupants—e.g., sequentially or concurrently. Further, the status assembly may provide an illuminated light bar having a color that corresponds to an illuminated seat color—making the system user-friendly.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, programmed to:
   determine a total trip parameter associated with a destination of an occupant of a vehicle;
   determine a progress parameter since an outset of an occupant trip; and
   control a light output of a status assembly, wherein the output represents the parameters in a non-alpha-numeric manner, wherein the parameters are a total trip time and a time since the outset or the parameters are a total trip distance and a distance since the outset, wherein the computer further is programmed to identify in which of a plurality of vehicle seats the occupant is located and, based on the identification, control a light color of at least a portion of the seat to a predetermined color, and wherein the predetermined color matches with a color of the light output on the status assembly.

2. The computer of claim 1, wherein the computer further is programmed to re-determine the parameters and change the output based on the recalculation.

3. The computer of claim 1, wherein the computer further is programmed to: determine in which of the plurality of vehicle seats a second occupant is located in the vehicle as a second seat, control a light color of at least a portion of the second seat to a second predetermined color, determine a total trip parameter and a progress parameter associated with the second occupant, and control the light output based on both occupants, wherein the respective outputs represent the respective parameters and the second predetermined color matches with a second color of the light output representing the second occupant parameters on the status assembly, and wherein the first predetermined color and the second predetermined color are different.

4. The computer of claim 3, wherein the output differs in color based on whether the parameters are associated with the first occupant or the second occupant.

5. The computer of claim 3, wherein the output cycles between a first light output associated with the first occupant and a second light output associated with the second occupant.

6. The computer of claim 3, wherein the output comprises a first light output associated with the first occupant and a second light output associated with the second occupant, wherein the first and second light outputs are presented concurrently.

7. The computer of claim 1, wherein the computer further is programmed to receive the destination from a mobile device.

8. The computer of claim 1, wherein the computer further is programmed to generate the light output by controlling an illumination of a plurality of light sources linearly-arranged between a first end and a second end, wherein the controlled illumination is based on repeatedly updating the progress parameter, wherein a visual appearance of the controlled illumination appears as a light bar, wherein the computer further is programed to execute a smoothing algorithm so that the controlled illumination from the plurality of light sources appears as a smoothly-extending bar.

9. The computer of claim 8, wherein the computer further is programmed to, when executing the algorithm, control the intensity of a leading edge region that includes some of the plurality of light sources.

10. A system comprising the computer and the status assembly of claim 1, wherein the computer is coupled electrically to the status assembly, wherein the assembly comprises a plurality of linearly-arranged light sources and a light guide.

11. The system of claim 10, wherein the light guide comprises a plurality of linearly-arranged protrusions, wherein each protrusion is positioned to receive light from a light source.

12. The system of claim 11, wherein the light guide comprises a base from which the plurality of linearly-arranged protrusions extends, wherein the base includes a surface through which the received light exits, wherein the light guide includes a mixing region between the surface and the plurality of linearly-arranged protrusions, wherein the mixing region is sized to permit light which is received via adjacently-located protrusions to mix.

13. The system of claim 12, wherein the mixing region is less than a predetermined threshold, wherein the threshold is defined by a ratio of a first distance (m) to a second distance (L), wherein length (L) is defined as a distance between the surface and a distal end of the respective protrusions, wherein length (m) is defined as a distance between the surface and a proximate end of the respective protrusions, wherein the proximate ends are adjacent the base.

14. The system of claim 13, wherein the threshold (m/L) is less than 0.5.

15. A method, comprising:
determining a total trip parameter associated with a destination of an occupant of a vehicle;
determining a progress parameter since an outset of an occupant trip;
controlling a light output of a status assembly, wherein the output represents the parameters in a non-alpha-numeric manner; and
based on controlling the light output, actuating a luminous element in a vehicle seat in which the occupant is located causing the element to emit a predetermined color in the visible spectrum,
wherein the controlled light output of the status assembly matches the predetermined color, and
wherein the parameters are a total trip time and a time since the outset or the parameters are a total trip distance and a distance since the outset.

16. A computer, programmed to:
determine a total trip parameter associated with a destination of an occupant of a vehicle;
determine a progress parameter since an outset of an occupant trip; and
control a light output of a status assembly, wherein the output represents the parameters,
wherein the computer further is programmed to generate the light output by controlling an illumination of a plurality of light sources linearly-arranged between a first end and a second end, wherein the controlled illumination is based on repeatedly updating the progress parameter, and wherein a visual appearance of the controlled illumination appears as a light bar, wherein the computer further is programed to execute a smoothing algorithm to vary light intensity along a curve so that the controlled illumination from the plurality of light sources appears as a smoothly-extending bar.

17. The computer of claim 16, wherein the computer further is programmed to, when executing the algorithm, control the intensity of a leading edge region that includes some of the plurality of light sources.

* * * * *